United States Patent [19]
Buzzelli

[11] Patent Number: 5,753,065
[45] Date of Patent: May 19, 1998

[54] HEAT WELDER WITH EXCESS SEAM MATERIAL REMOVING APPARATUS AND METHOD

[75] Inventor: Garry W. Buzzelli, Rootstown, Ohio

[73] Assignee: Edinburg Fixture & Machine, Inc., Rootstown, Ohio

[21] Appl. No.: 610,530

[22] Filed: Mar. 4, 1996

Related U.S. Application Data

[60] Provisional application No. 60/002,068, Aug. 9, 1995.

[51] Int. Cl.$^6$ .................................... B29C 65/20
[52] U.S. Cl. .................... 156/304.6; 156/309.9; 156/499; 156/556; 269/41
[58] Field of Search .................... 156/304.6, 309.9, 156/556, 499, 503; 269/41

[56] References Cited

U.S. PATENT DOCUMENTS

| | | |
|---|---|---|
| 4,284,464 | 8/1981 | Förster . |
| 4,548,669 | 10/1985 | Steinmann et al. . |
| 4,684,430 | 8/1987 | Handa et al. . |
| 4,752,350 | 6/1988 | Schuster . |
| 4,909,892 | 3/1990 | Quinn et al. . |
| 4,963,219 | 10/1990 | Nichols et al. . |
| 4,963,421 | 10/1990 | Dickinson et al. . |
| 4,971,639 | 11/1990 | Quinn et al. . |
| 4,987,018 | 1/1991 | Dickinson et al. . |
| 4,995,935 | 2/1991 | Ganzberger . |
| 5,006,198 | 4/1991 | Pasquini . |
| 5,125,495 | 6/1992 | Ganzberger et al. . |
| 5,246,534 | 9/1993 | Tanner et al. . |
| 5,599,419 | 2/1997 | Hunter et al. . |

Primary Examiner—Michael W. Ball
Assistant Examiner—Sam Chuan Yao
Attorney, Agent, or Firm—Pearne, Gordon, McCoy & Granger LLP

[57] ABSTRACT

Window frame elements to be fusion welded are mounted on movable beds. A locating plate is provided adjacent the heating plate for precise positioning of the frame elements. After the elements are heated, the heating plate is withdrawn by sliding the heating plate from between the frame elements while they are still in contact with the heating plate, thereby drawing a bead of excess seam material in the direction of the sliding. Thus, the inside corner is formed without a bead. Movable stops are provided for each bed to ensure precise positioning of the beds during each step of the process.

11 Claims, 4 Drawing Sheets

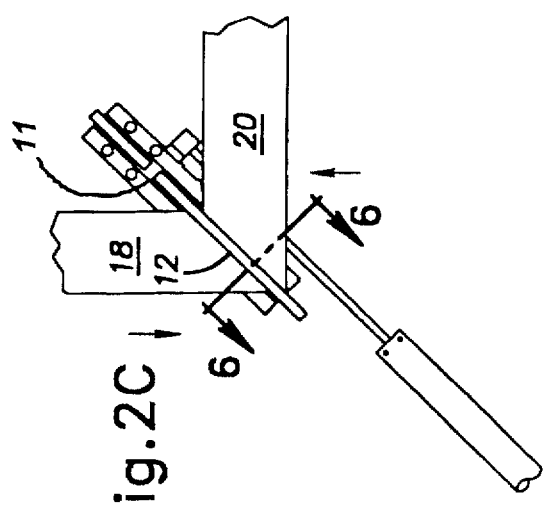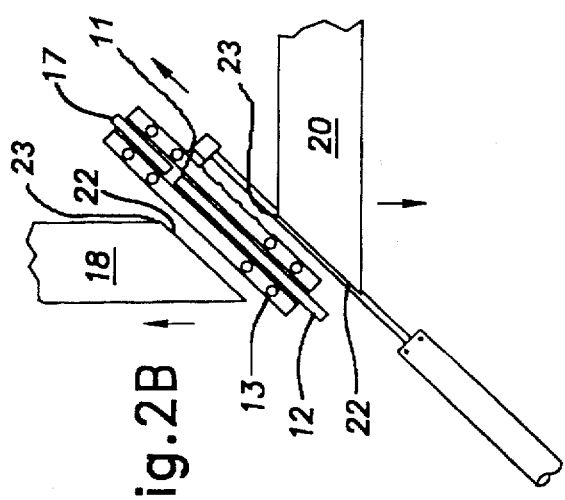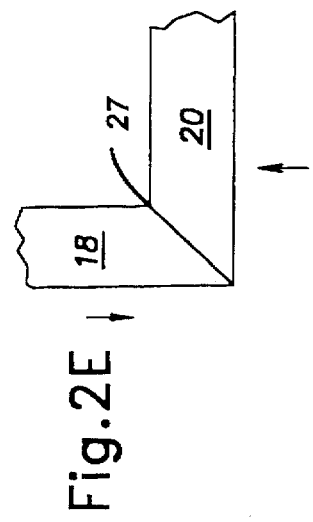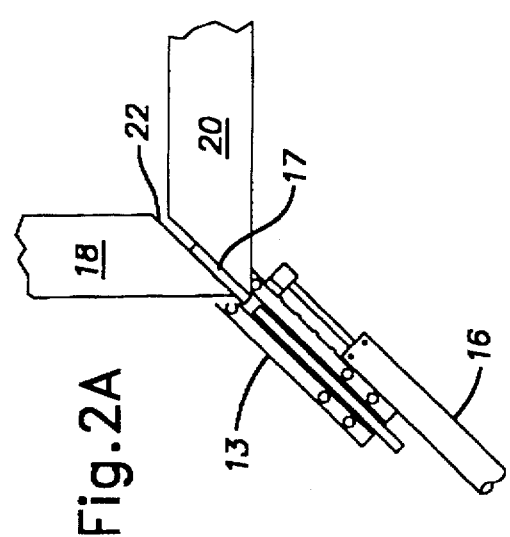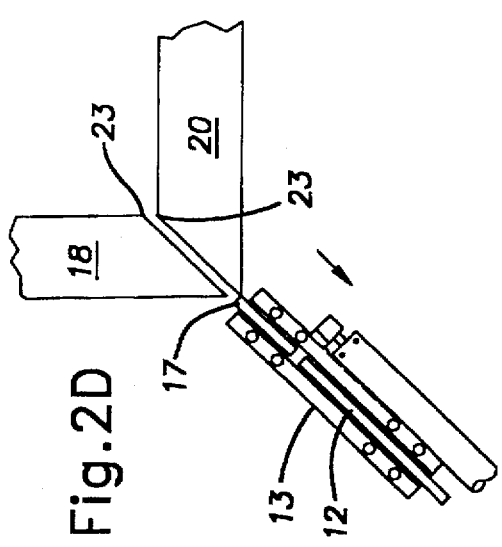

HEAT WELDER WITH EXCESS SEAM MATERIAL REMOVING APPARATUS AND METHOD

This application claims the benefit of Provisional U.S. patent application Ser. No. 60/002,068, filed Aug. 9, 1995.

BACKGROUND OF THE INVENTION

1. Field of the Invention

This invention relates generally to the field of heat welding and specifically to a welder and method for removing excess seam material.

2. Description of the Related Art

Innumerable products are manufactured from plastic elements that are fusion welded together by heating parts of the elements and joining the elements. For example, window frames for building installations include extruded plastic frame elements assembled by welding. When numerous identical products are assembled by welding, it is desirable to use a heat welding apparatus. Such a heat welder positions the elements to be assembled, heats the parts to be joined, and presses the elements together until the elements cool to form a rigid weld. Examples of such welders are described in U.S. Pat. Nos. 4,284,464 to Förster; 4,684,430 to Handa; 4,752,350 to Schuster; 4,909,892 and 4,971,639 to Quinn; 4,963,219 to Nichols; 4,963,421 and 4,987,018 to Dickinson; 4,995,935 to Ganzberger; and 5,246,534 to Tanner, all incorporated herein by reference.

When two elements are fusion welded, the parts that are heated must be softened so that the parts will bond with each other. When the softened parts are pressed together, some of the material of the elements spreads to form a bead of excess material. For example, the window frame elements are commonly extruded, hollow plastic members welded at mitered ends to form a corner. The bead is formed along a seam where edges of the mitered ends are joined. The external faces of the frame must be cleaned to remove excess seam material thereby providing a smooth, attractive surface at the corner. This is generally accomplished by grinding, cutting or scraping.

The faces and outside corners of the mitered joint can be cleaned efficiently with automatic grinders. An example of a grinding apparatus is shown in U.S. Pat. No. 5,125,495 to Ganzberger. However, the inside corner must be cleaned by hand or with a numerically controlled grinder. Either method is costly and inefficient. More efficient apparatus and method for obtaining welded plastic parts without seams of excess material are desired.

SUMMARY OF THE INVENTION

The present invention provides an apparatus and method for welding an end of one member to an end of another member. The method includes moving two beds adapted to support the respective members to a first engaged position; positioning the ends of the two members against opposite faces of a locating element; securing the members to the respective beds; moving a heating element between the ends of the members and energizing the heating element, the heating element having substantially the same thickness as the locating element; moving the beds to a second engaged position so as to press the ends into opposed faces of the energized heating element thereby softening the ends; sliding the heating element from between the ends of the members while maintaining the beds in the second engaged position so as to draw excess material outwardly with the heating element; moving the beds to a third engaged position so as to press the ends together thereby joining the members; and removing the joined members from the beds.

The beds are moved to a retracted position after securing the members to the beds. The beds are moved in opposite directions along parallel paths. Stops associated with the beds are moved to a first position prior to moving the beds to the first engaged position, the stops defining the first engaged position. The stops are moved to a second position prior to moving the beds to the second engaged position, the stops defining the second engaged position. The beds are moved to a retracted position before moving the stops to the second position to allow movement of the stops. The beds are moved to a retracted position after sliding the heating element from between the members to allow movement of the stops. The stops are moved to a third position prior to moving the beds to the third engaged position, the stops defining the third engaged position.

The invention also provides an apparatus and method for welding ends of two members to opposite ends of a third member. The method includes the steps of moving three beds adapted to support the respective members to a first engaged position; positioning the ends of the third member against faces of respective locating elements; positioning the ends of the two members against opposite faces of the respective locating elements; securing the members to the respective beds; moving respective heating element between the ends of the members to be welded and energizing the heating elements, the heating elements having substantially the same thickness as the locating elements; moving the beds along parallel linear paths to a second engaged position so as to press the ends into opposed faces of the energized heating elements thereby softening the ends; sliding the heating elements from between the ends of the members while maintaining the beds in the second engaged position so as to draw excess material outwardly with the heating elements; moving the beds along parallel linear paths to a third engaged position so as to press the ends together thereby joining the members; and removing the joined members from the beds. Stops associated with the beds are moved to different positions defining the respective engaged positions of the beds prior to moving the beds to the engaged positions.

The apparatus for welding one member to another member includes two movable member supports adapted for supporting the respective members. An actuator is associated with each member support and adapted for moving the associated member support to an engaged position at which the members can be welded. A locating element is adapted for positioning the members on the supports. A heating element is movable to a heating position between the two members and adapted for heating the members when the supports are in the engaged position.

The locating element is movable to a locating position between the two members. The locating element is a plate having a thickness substantially the same as a thickness of the heating element. A movable heater support has the heating element and the locating element disposed thereon. An actuator is adapted for moving the heater support to the locating position, the heating position, and a retracted position wherein the heating element and the locating element are withdrawn from between the members. A clamp is associated with each member support for mounting the members to be welded on the respective member support. The member supports are movable beds disposed on a base.

Two stop apparatus are provided, one associated with each member support. Each stop apparatus is movable to define a locating position of the member support when the member support is engaged, a heating position of the member support when the member support is engaged, and a joining position of the member support when the member support is engaged. Each stop apparatus has a stop plate with an offset member and first and second stops opposing the stop plate and offset member. The stop plate and stops are movable to define the locating position of the member support wherein the first stop contacts the offset member when the member support is engaged, the heating position of the member support wherein the first stop contacts the stop plate when the member support is engaged, and the joining position of the member support wherein the second stop contacts the stop plate when the member support is engaged. The stops are bolts threaded into a stop mount. The offset member is an adjustment screw threaded into the stop plate.

The apparatus for welding ends of two members to respective opposite ends of a third member to form two welded joints includes three movable member supports adapted for supporting the respective members. An actuator is associated with each member support and adapted for moving the associated member support to an engaged position at which the members can be welded. A locating element is associated with each of the joints to be welded and adapted for positioning the members on the supports. A heating element is associated with each of the joints to be welded and is movable to a heating position between the two members and adapted for heating the members when the supports are in the engaged position.

Each locating element is movable to a locating position between the two corresponding members to be welded. Each locating element is a plate having a thickness substantially the same as a thickness of the corresponding heating element. Two movable heater supports each have one of the heating elements and one of the locating elements disposed thereon. The member supports are adapted for reciprocating linear movement along parallel lines.

BRIEF DESCRIPTION OF THE DRAWINGS

FIGS. 2A–2E show partial front views of the welding apparatus showing different steps of a welding process;

DESCRIPTION OF THE PREFERRED EMBODIMENTS

Figure 1:
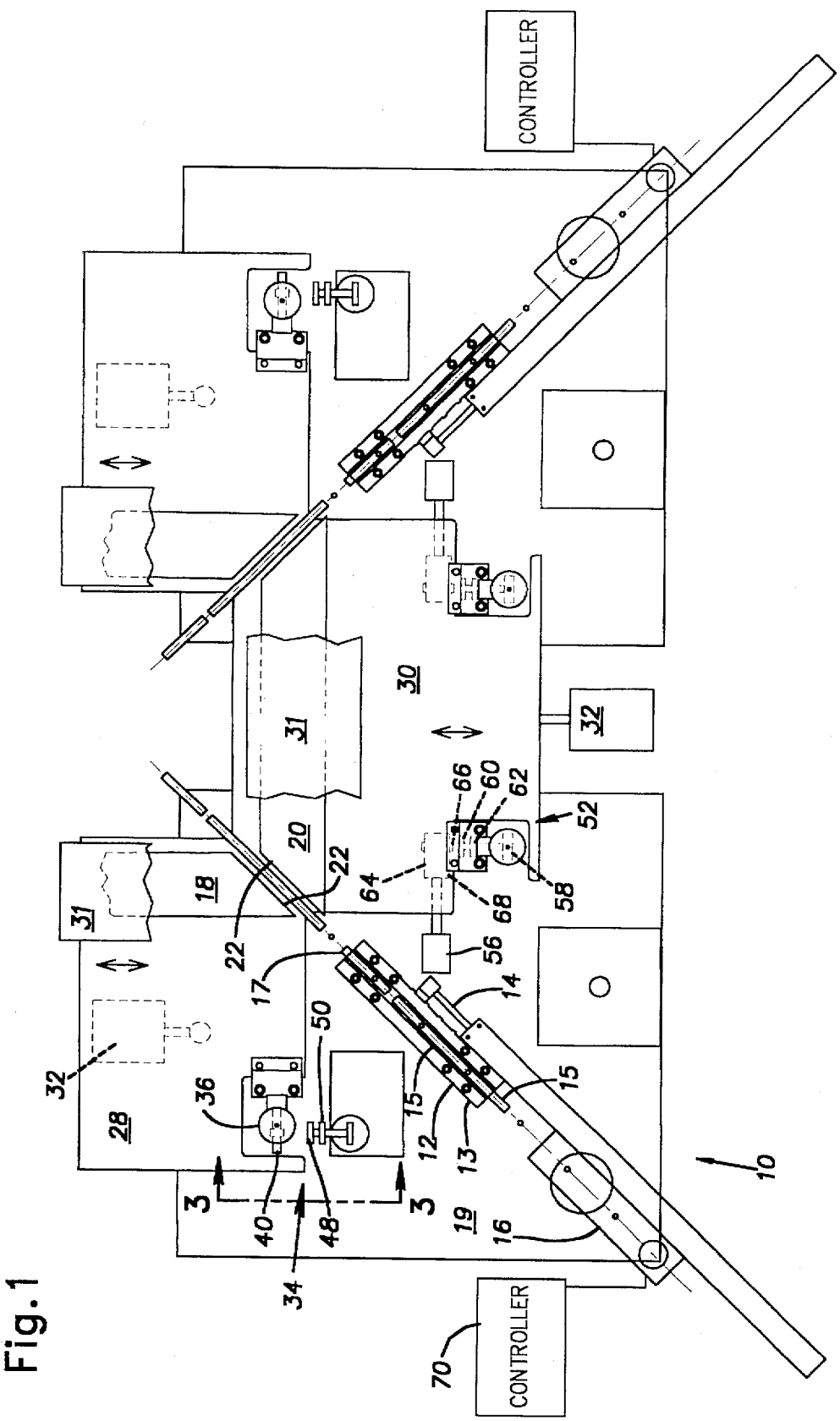
FIG. 1 shows a front view of a welding apparatus according to the invention.

Referring to FIG. 1, a welder 10 is provided for fusion welding of plastic members, such as extruded elements of window frames. The welder 10 includes a movable heating element 12, such as a heating plate, which is mounted to a heater support 13. A shaft 14 of a pneumatic, hydraulic or servo controlled actuator 16 is connected to move the heater support 13 to several positions along a linear path. The heating element 12 is an electrically heated, copper plate having a pair of opposite faces 15 coated with Polytetrafluoroethylene paper. A locating element, such as a plate 17 is mounted on the heater support 13 adjacent the heating element 12. The locating plate 17 is preferably a steel plate having the same thickness as the heating element 12 and is mounted coplanar therewith. The actuator 16 is adapted for moving the heating element 12 and locating plate 17 between a locating position, a heating position and a retracted position, as discussed below. In the heating position, the heating element 12 is in a welding zone between parts to be welded. The actuator 16 is mounted on a base 19 supported on a frame (not shown) of the welder 10. The locating element can alternatively be mounted separately from the heating element 12. For example, the locating plate can be movable separately from the heating element or can comprise separate locating parts associated with each bed and clamp to accurately space elements to be welded according to the thickness of the heating element.

The window frame to be welded includes a first frame element 18 and a second frame element 20. The frame elements 18, 20 are securely held on opposite sides of the heating element 12. In the example shown, the weld is made at a right-angle corner of the window frame, thus, the frame elements 18, 20 are each disposed at a 45° angle with respect to the faces 15 of the heating element 12 so that mitered ends 22 of the elements are parallel with the faces 15 of the heating element 12.

Figure 4:
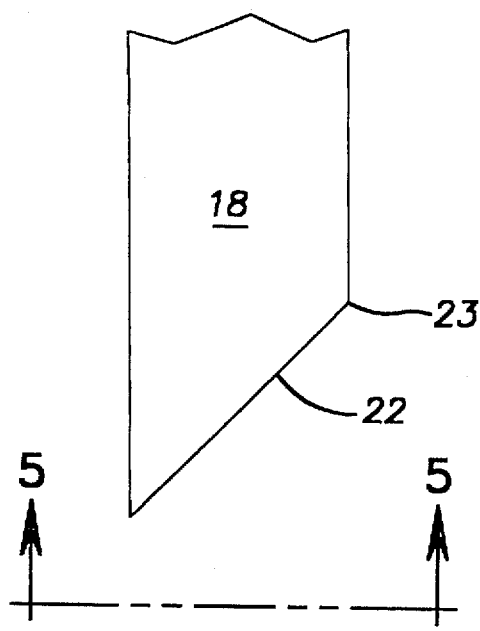
FIG. 4 shows a detail of an end of a part to be welded.
Figure 5:
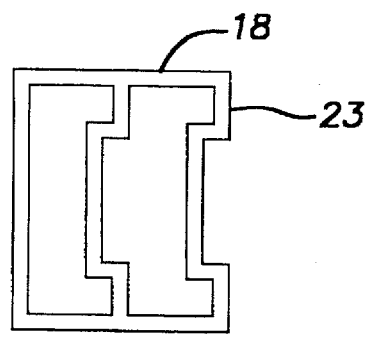
FIG. 5 shows an end view of the part taken from line 5—5 of FIG. 4.

Referring to FIGS. 4 and 5, the frame elements have matching hollow cross-sections defined by extruded plastic walls. Edges of the walls to be welded are preferably precisely aligned and joined. Inside edges 23 of the ends 22 are joined to form an inside corner 27, as shown in FIG. 2E. Outside edges 25 form an outside corner.

Returning to FIG. 1, the frame elements 18, 20 are mounted on respective first and second frame element supports, such as beds 28, 30 that are movably mounted on the base 19. To align and hold the frame elements 18, 20, clamp assemblies 31 (partially cut away in FIG. 1 to show other components) are provided on the respective beds 28, 30. The beds are moved on parallel lines by respective pneumatic bed moving actuators 32. The bed actuators are preferably two position devices for moving the beds 28, 30 between engaged and retracted positions. A first stop apparatus 34 is associated with the first bed 28. The first stop 34 includes a vertically disposed bed actuator 36 mounted on the first bed 28. The first stop 34 also includes a vertically disposed base actuator 38 mounted on the base 19.

Figure 3C:
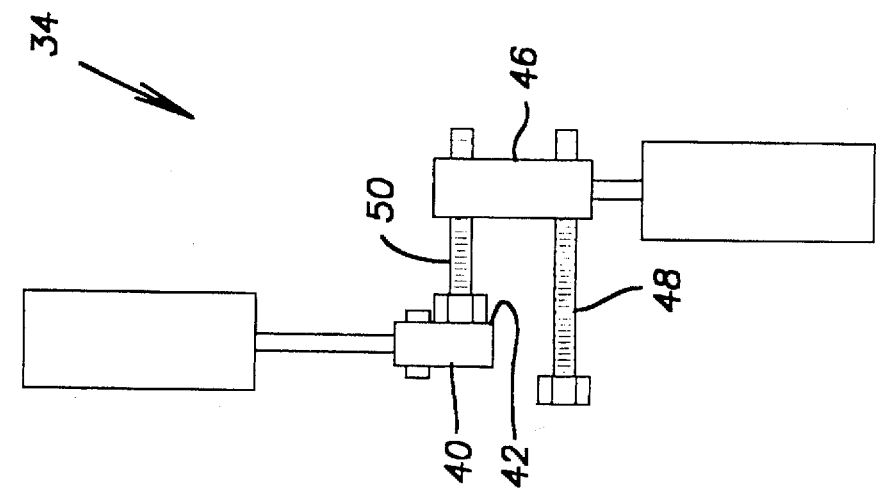
FIGS. 3A–3C show side elevational detail views of a stop apparatus (taken from line 3—3 of FIG. 1) at different positions during the welding process.
Figure 3B:
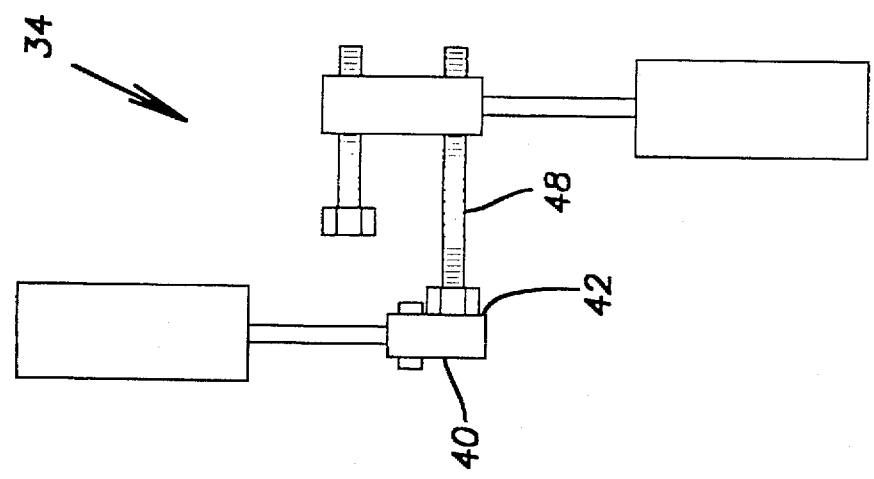
Figure 3A:
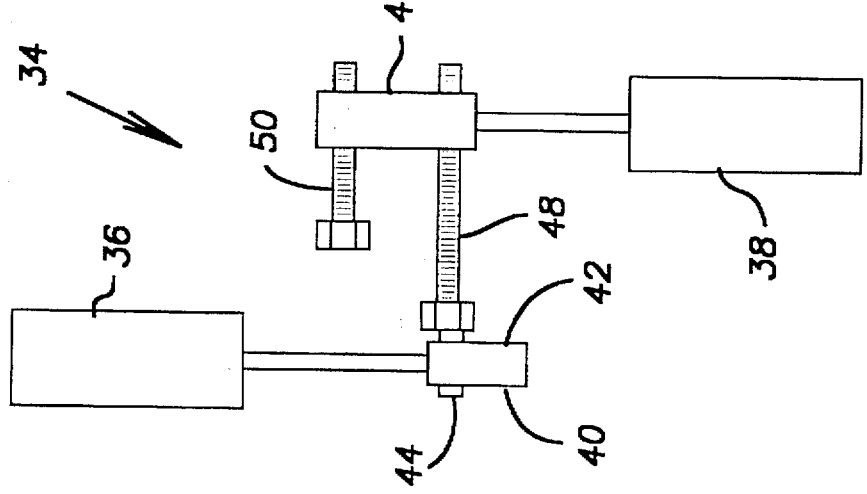

Referring to FIG. 3A, a shaft of the bed actuator 36 has a stop plate 40 mounted thereon. The stop plate 40 is a rigid member defining a stop surface 42 having an offset member projecting therefrom. The offset member is preferably an adjustment screw 44 threaded through the stop plate 40. The stop plate 40 is vertically movable by the bed actuator 36. The base actuator 38 has a stop mount 46 mounted on a shaft thereof. First and second stop bolts 48, 50 are threaded through the stop mount 46. Preferably, the second stop bolt 50 is shorter than the first. The stop mount 46 and bolts 48, 50 are vertically movable by the base actuator 38.

Referring to FIG. 1, the second bed 30 is provided with a second stop apparatus 52 similar to the first. The second stop 52 includes a vertically disposed bed actuator 54 mounted on the second bed 30 and a horizontally disposed base actuator 56 mounted on the base 19. The bed actuator 54 is adapted for moving a stop mount 58 having first and second stop bolts 60, 62 threaded therein. The bed actuator 56 is adapted for moving a stop plate 64 provided with an offset member, such as an adjusting screw 66 threaded therein and projecting from a stop surface 68.

The actuators described herein are preferably pneumatic cylinders adapted for moving a shaft linearly between two positions. Other actuators are also suitable, such as hydraulic cylinders, servos, and solenoids. As described, the heating element actuator 16 is adapted for positioning the heating element 12 and locating plate 17 at more than two positions.

Referring to FIG. 2A, the heater support 13 is moved to a locating position with the locating plate 17 in the welding zone. Referring to FIG. 1, the bed moving actuators 32 move the beds 28 and 30 to the engaged position. Referring also to FIG. 3A, the first bed stop apparatus 34 limits travel of the first bed 28 to a locating position. The bed and base actuators 36, 38 move the stop plate 40 and the stop mount 46 so that the first stop bolt 48 and adjustment screw 44 are aligned. When the first bed 28 is moved to the engaged position, the adjustment screw 44 contacts the stop bolt 48 to limit travel of the bed 28 thereby defining the locating position. The adjustment screw 44 projects from the stop surface 42 a distance equal to the amount of the frame element 18 to be softened during heating, as is apparent from the following description. The locating position of the second bed 30 is similarly defined by the stop bolt 60 contacting the adjustment screw 66 of the second stop apparatus 52 when the second bed 30 is moved to the engaged position. Referring to FIG. 2A, the second frame element 20 is placed on the second bed 30 and clamped in place with the end 22 of the second frame element 20 pressed against one face of the locating plate. The first frame element 18 is placed on the first bed with the end 22 of the element 18 pressed against the opposite face of the locating plate 17. The first frame element 18 is clamped in place.

Referring to FIGS. 1 and 2B, the bed moving actuators 32 retract the beds 28, 30 so as to separate the frame elements from the locating plate 17. The heater support 13 is moved so that the heating element 12 in located between the ends 22 of the frame elements 18, 20. An inside edge 11 of the heating element is disposed inwardly of the inside edges 23 of the frame elements 18, 20. The heating element 12 is energized to a heating temperature sufficient to melt the plastic material of the frame elements. When the beds 28, 30 are in a retracted position, the first stop bolts 48, 60 are moved out of alignment with the adjustment screws 44, 66 by the corresponding actuators 38, 58. Thus, the stop apparatus 34, 52 are moved to a second position wherein the first stop bolts 48, 60 are aligned with the stop surfaces 42, 68.

Figure 6:
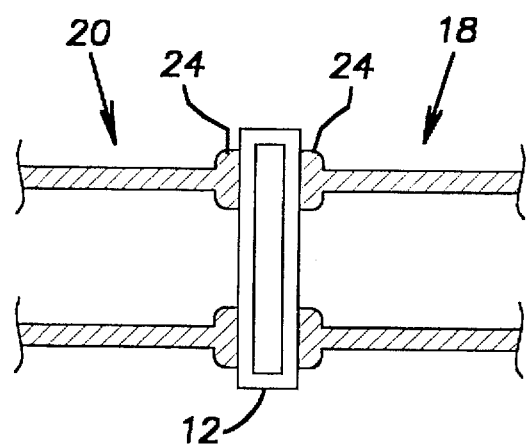
FIG. 6 shows a detail view of two parts being heated taken from line 6—6 of FIG. 2C.

Referring to FIG. 2C, the frame elements 18, 20 are moved to the engaged position wherein the ends 22 are pressed against the faces of the heating element 12 and heated. The ends soften or melt as they are heated and the beds continue to move toward the heating element by force of the bed moving actuators until the first stop bolts 48, 60 contact the stop surfaces 42, 68 at a heating position, as shown in FIG. 3B. Heating is timed and preferably lasts about 15 seconds to melt about 1/16 of an inch of each frame element. The melted material forms beads 24 at the ends of the frame elements 18, 20, as shown in FIG. 6.

While the frame elements 18, 20 are maintained in the heating position, the heating support 13 is retracted to slide the heating element 12 and the locating plate 17 from between the frame elements, as shown in FIG. 2D. The heating element moves in an outward direction from the inside edges 23 toward the outside edges 25 so that the inside edge 11 of the heating element moves toward the inside edges 23 of the members. Sliding the heating element 12 from between the frame element 18, 20 draws the beads 24 in the direction of the sliding. In particular, the beads at the inside edges 23 of the frame elements are pulled into the hollow interiors of the frame elements.

After the heating element 12 is withdrawn, the beds are moved to further separate the frame elements 18, 20 so that the stop apparatus 34, 52 can be moved to a third position. To obtain the third position, the stop mounts 46, 58 are moved so that the second stop bolts 50, 62 align with the stop surfaces 42, 68 and the first stop bolts 48, 60 clear the stop plates 40, 64, as shown for the first stop apparatus 34 in FIG. 3C. When the stops 34, 52 are in the third position, the frame elements 18, 20 are closed to a joining position, shown in FIG. 2E, in which the second stop bolts 50, 62 contact the stop surfaces 42, 68, as shown in FIG. 3C. To ensure proper joining of the ends 22, each element 18, 20 is moved approximately 3/32 of an inch past where they would have met prior to welding. Of the 3/32 of an inch, 1/16 of an inch accounts for the material melted and forming the bead and 1/32 of an inch provides adequate pressure and material to form a durable weld. The offset between the first stop bolts 48, 60 and the second stop bolts 50, 62 represents half of the thickness of the heating element, which has been withdrawn, and the additional 3/32 of an inch by which each element has been moved for joining. The frame elements 18, 20 are held in the joining position and allowed to cool for about 20 seconds. Then, the clamps 31 are opened and the joined frame elements are removed. After removal, beads on the faces and outside corner of the weld joint are cleaned by grinding, but cleaning of the inside corner 23 is not required because the bead was removed during the welding process.

Operation of the actuators 16, 32, 36, 38, 54, 56 is controlled by a programmable controller 70 adapted to receive input information regarding frame sizes, heating and joining times, and other parameters. The controller automatically operates the actuators to perform the operational steps described.

The welder described is adapted for welding two sets of three frame elements. Welding of only one corner is described with reference to one side of the welder. The second corner is welded according to an identical process performed by another side of the welder, which is a mirror image of the apparatus described. The clamps are adapted for holding two sets of frame elements. A first set of three frame elements is welded at two corners, as described. A second set of frame elements is disposed directly beneath the first set. The second set of frame elements is welded using the same heating element 12 and other parts of the welder according to the process described.

After welding two corners of a window frame, the three joined elements can be reversed and welded to a fourth frame element at two other corners. Because the three elements are rigidly welded, they must be moved as a unit. Therefore, it is preferable to move the beds along parallel lines when joining the fourth element to the other three elements. The process and apparatus according to the invention can be adapted for welding as many or as few parts as is desired. The apparatus can also be adapted for welding other configurations of parts.

The present disclosure describes several embodiments of the invention, however, the invention is not limited to these embodiments. Other variations are contemplated to be within the spirit and scope of the invention and appended claims.

What is claimed is:

1. A method of welding an end of one member to an end of another member on a welder comprising a base; two beds movable on the base and adapted to support the respective members; two stop apparatus, one associated with each bed, each stop apparatus comprising (a) a first actuator disposed on one of the base and the bed, (b) a stop plate movable by the first actuator and defining a stop surface, (C) an offset member at the stop plate, (d) a second actuator disposed on the other of the base and the bed, (e) a stop mount movable by the second actuator, and (f) first and (g) second stops mounted on the stop mount and opposing the stop plate, the method comprising the steps of:

moving the stop plates and stop amounts to define a first engaged position of the beds wherein each first stop contacts the respective offset member when the beds are engaged:

moving the two beds to the first engaged position;

positioning the ends of the two members against opposite faces of a locating element so as to define inside edges of the members that will be joined to form an inside corner and outside edges where the members will be joined;

securing the members to the respective beds;

moving a heating element between the ends of the members so that an inside edge of the heating element is inside of the inside edges of the members and energizing the heating element, the heating element having substantially the same thickness as the locating element;

moving the stop plates and stop mounts to define a second engaged position of the beds wherein each first stop contacts the respective stop surface when the beds are engaged;

moving the beds to the second engaged position so as to press the ends into opposed faces of the energized heating element thereby softening the ends;

sliding the heating element from between the ends of the members in a direction from the inside edges of the members toward the outside edges of the members so that the inside edge of the heating element moves toward the inside edges of the members while maintaining the beds in the second engaged position so as to draw excess material with the heating element;

moving the stop plates and stop mounts to define a third engaged position of the beds wherein each second stop contacts the respective stop surface when the beds are engaged;

moving the beds to the third engaged position so as to press the ends together thereby joining the members; and removing the joined members from the beds.

2. A method according to claim 1 further comprising the step of moving the beds to a retracted position after securing the members to the beds and before moving the heating element between the ends.

3. A method according to claim 1 wherein the beds are moved in opposite directions along parallel paths.

4. A method according to claim 1 further comprising the step of moving the beds to a retracted position before moving the stops to the second position to allow movement of the stops.

5. A method according to claim 1 further comprising the step of moving the beds to a retracted position after sliding the heating element from between the members to allow movement of the stops.

6. A method according to claim 1 wherein the third engaged position is such that the members are moved toward each other past a position where the members would have met prior to softening of the ends.

7. A method according to claim 1 wherein the locating element follows the heating element past the inside edges during the step of sliding the heating element.

8. A method according to claim 1 wherein the offset member is an adjustment screw threaded in the stop plate.

9. A method according to claim 1 wherein the stops comprise bolts threaded into the stop mount.

10. A method according to claim 1 wherein the stop plate and stop mount are longitudinally movable on substantially linear paths; the stops project laterally from the stop mount; and the stops are substantially aligned along the longitudinal movement path of the stop mount.

11. A method according to claim 1 wherein the offset member is an adjustment screw threaded in the stop plate; the stops comprise bolts threaded into the stop mount; the stop plate and stop mount are longitudinally movable on substantially linear paths; the stops project laterally from the stop mount; and the stops are substantially aligned along the longitudinal movement path of the stop mount.

* * * * *